United States Patent [19]

Kitamura et al.

[11] Patent Number: 5,511,435
[45] Date of Patent: Apr. 30, 1996

[54] APPARATUS FOR MEASURING VEHICLE RUNNING CONDITION

[75] Inventors: Kazuhisa Kitamura, Fussa; Sadao Nagashima, Tokorozawa, both of Japan

[73] Assignee: Casio Computer Co., Ltd., Tokyo, Japan

[21] Appl. No.: 316,788

[22] Filed: Sep. 30, 1994

[30] Foreign Application Priority Data

Oct. 4, 1993 [JP] Japan .................................. 5-273115
Nov. 22, 1993 [JP] Japan .................................. 5-317338

[51] Int. Cl.⁶ .......................... G01R 1/00; G01P 3/487; B60L 1/00
[52] U.S. Cl. .................. 73/865.9; 324/166; 324/168; 324/171; 324/433; 73/489; 73/490; 340/432
[58] Field of Search .............................. 73/865.9, 489, 73/490; 340/432; 324/166, 168, 171, 433

[56] References Cited

U.S. PATENT DOCUMENTS

| | | | |
|---|---|---|---|
| 4,007,419 | 2/1977 | Jasmine | 324/166 |
| 4,071,892 | 1/1978 | Genzling | 73/490 |
| 4,636,769 | 1/1987 | Tsuyama | 340/432 |
| 4,642,606 | 2/1987 | Tsuyama | 340/432 |
| 4,862,395 | 8/1989 | Fey et al. | 340/432 |
| 5,008,647 | 4/1991 | Brunt et al. | 340/432 |
| 5,177,432 | 1/1993 | Waterhouse et al. | 340/432 |

FOREIGN PATENT DOCUMENTS

| | | |
|---|---|---|
| 0316912 | 5/1989 | European Pat. Off. . |
| 0431243 | 6/1991 | European Pat. Off. ............... 324/166 |

OTHER PUBLICATIONS

Patent Abstracts of Japan, vol. 9, No. 27 (E-294) Feb. 6, 1989 & JP-A-59 172 745 (Matsushita Denshi Kogyo).

Proceedings of the IEEE Multi-Chip Module Conference MCMC-93, Mar. 1993, Santa Cruz, CA. US., pp. 74-78, Ostmann et al., The Pretreatment of Aluminum Bondpads for Electroless Nickel Plating.

Solid State Technology, vol. 33, No. 6, Jun. 1990, Washington US, pp. 91-94, LO and TJHIA, Backsputtering Etch Studies in Wafer Bumping Process.

*Primary Examiner*—Hezron E. Williams
*Assistant Examiner*—Daniel S. Larking
*Attorney, Agent, or Firm*—Frishauf, Holtz, Goodman, Langer & Chick

[57] ABSTRACT

A battery-powered rotation detector detects passing of a rotating magnet attached to a vehicle wheel to generate and transmit a rotation signal. A receiver receives the rotation signal. A processor computes the vehicle running condition (e.g., speed, traveled distance) from the received rotation signal and displays the results on a display device. The processor monitors intervals between the rotation signals to detect when the vehicle is stopped. When the vehicle is stopped, the processor disconnects a battery power supply from components such as the display device for power savings. In addition, the processor checks the strength of the received rotation signal to determine a capacity of the battery in the rotation detector, and operatively indicates a power failure of the rotation detector.

15 Claims, 11 Drawing Sheets

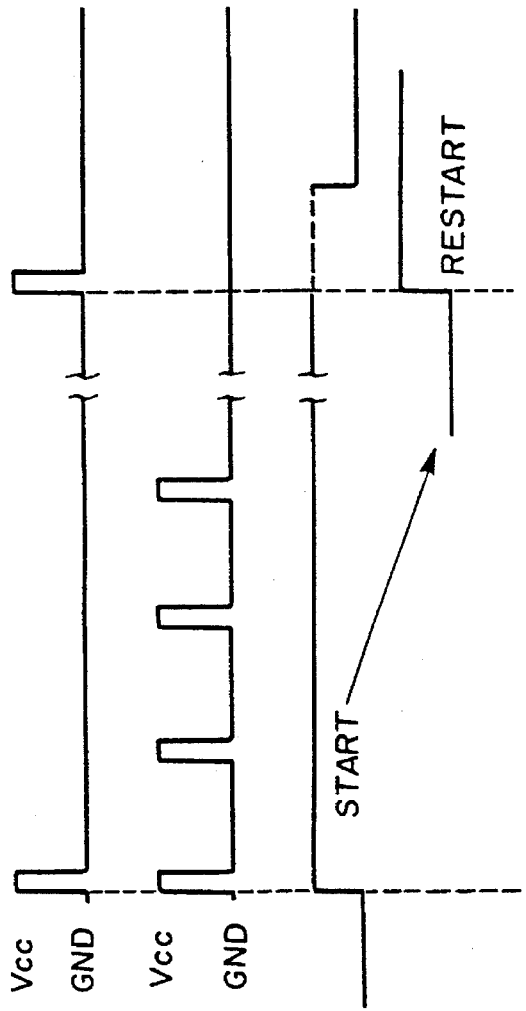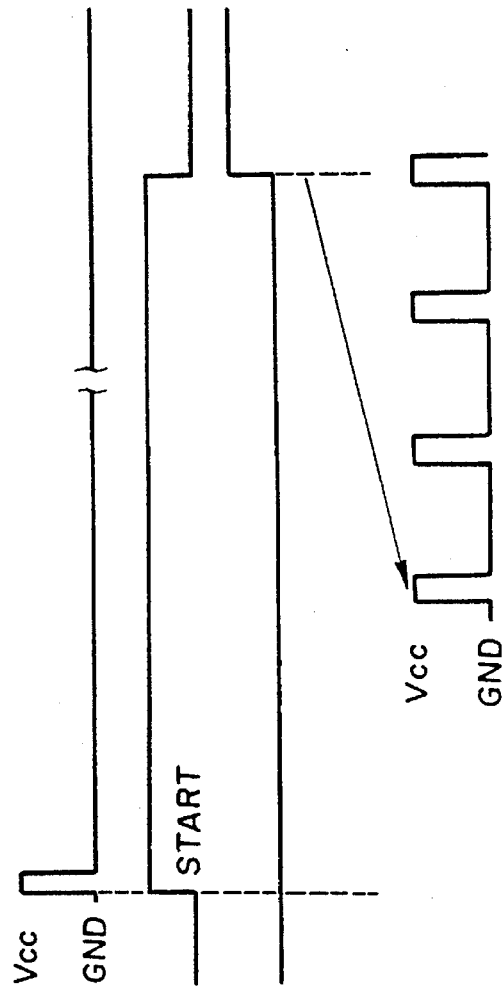

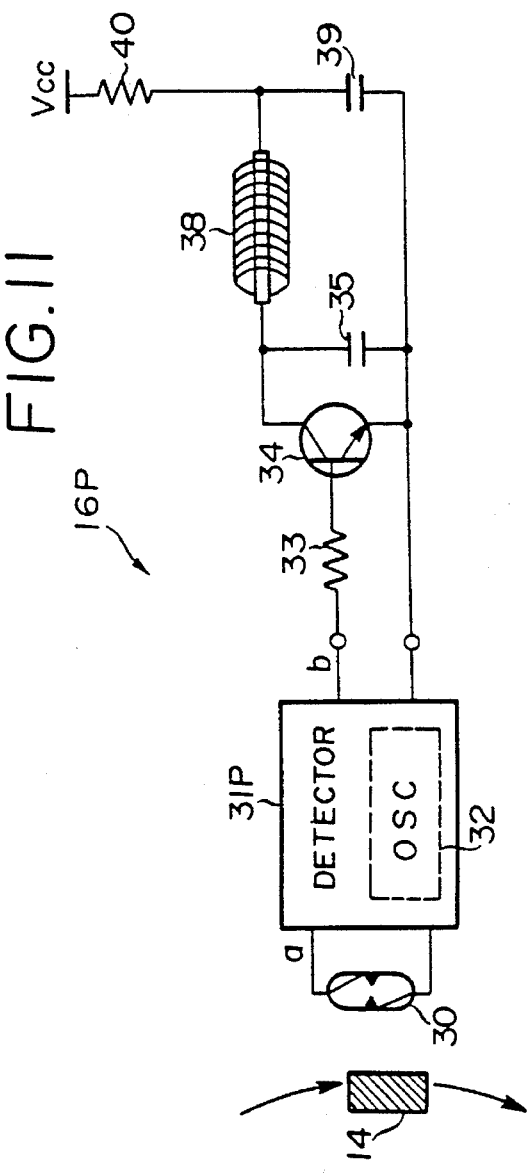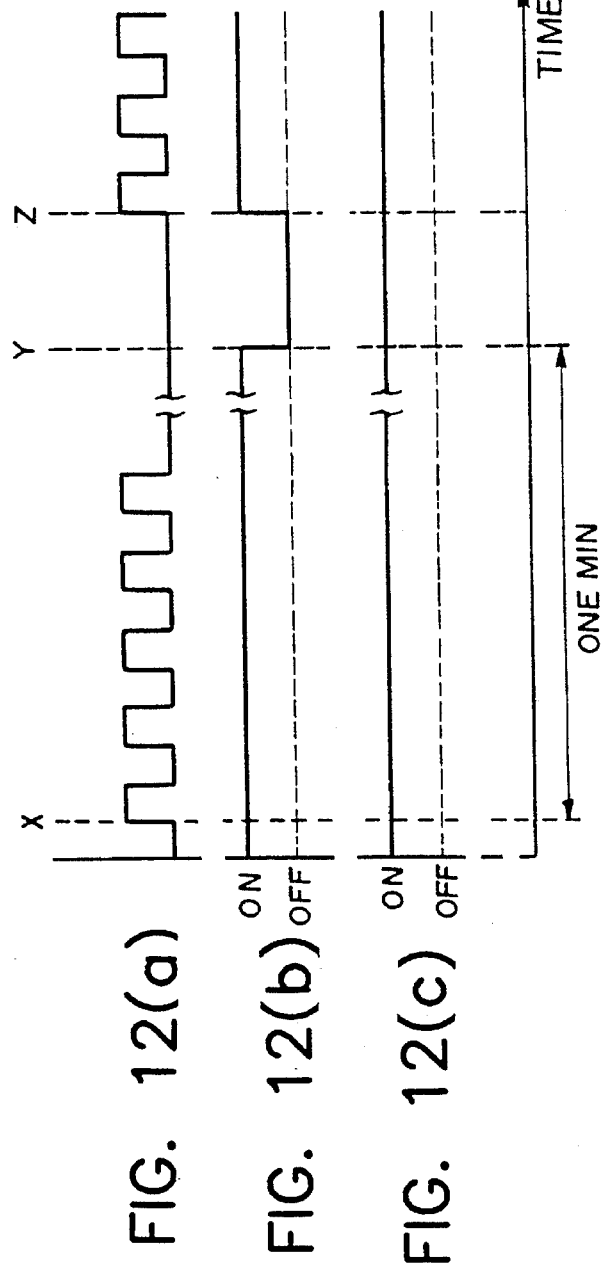

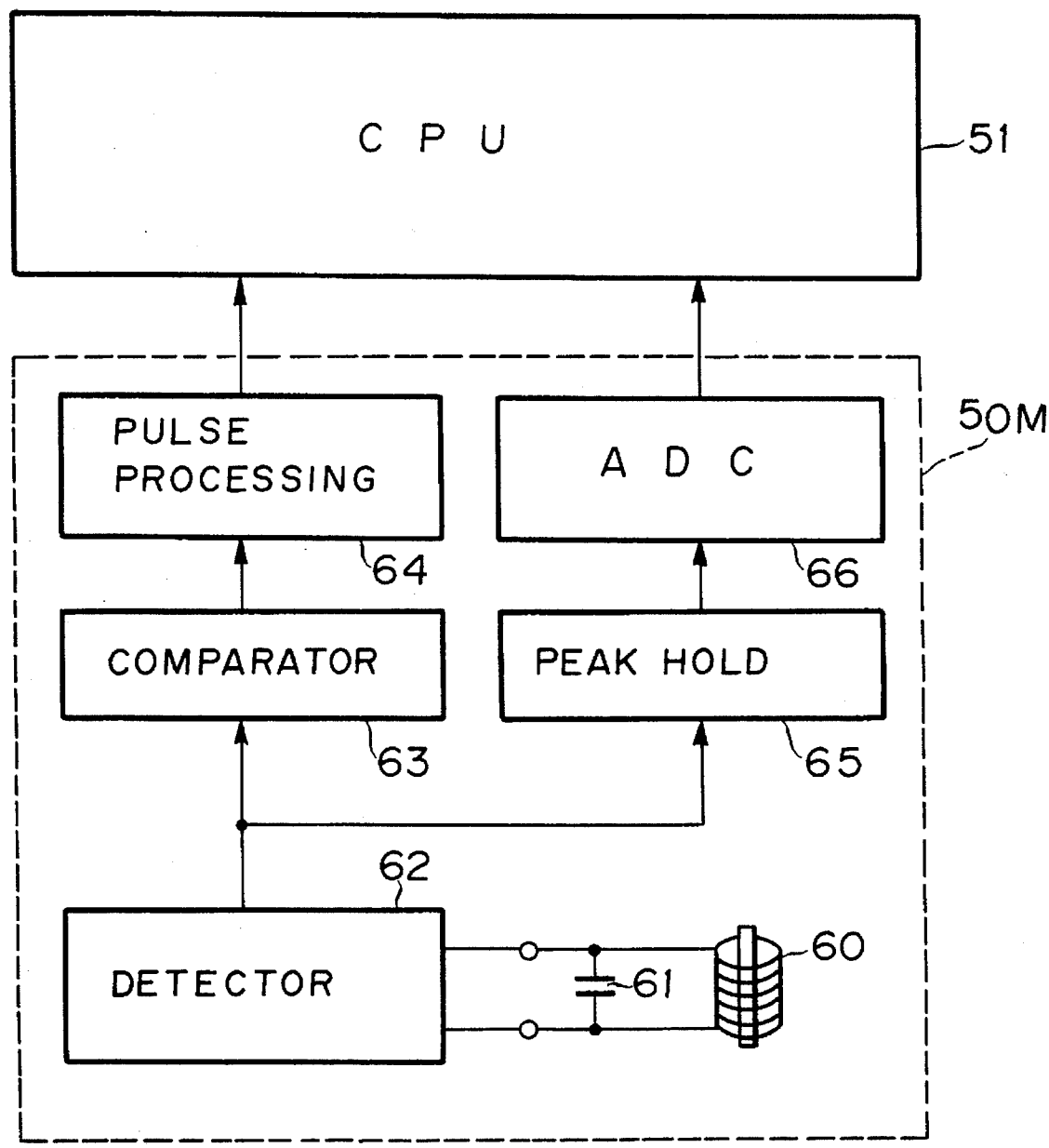

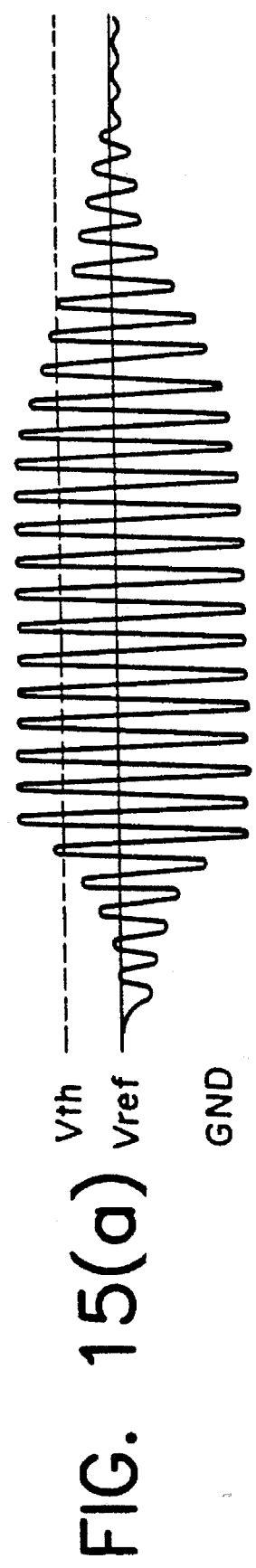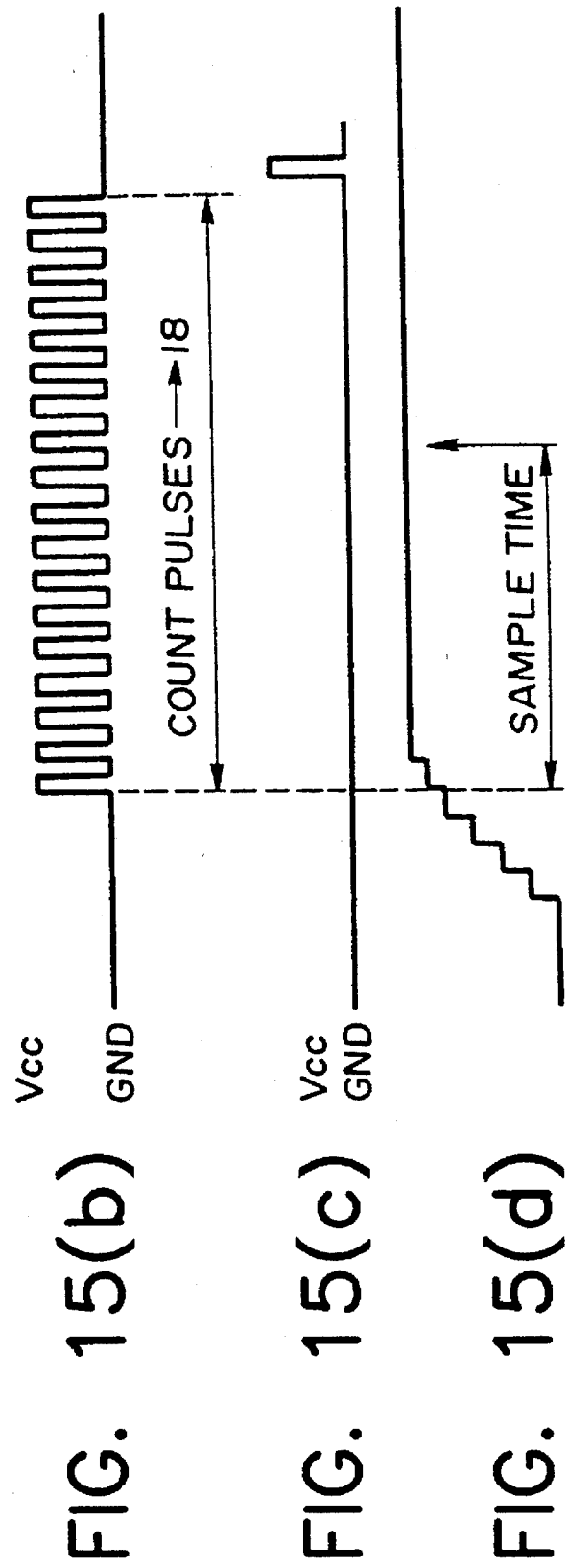

APPARATUS FOR MEASURING VEHICLE RUNNING CONDITION

BACKGROUND OF THE INVENTION

1. Field of the Invention

The present invention relates to apparatus for measuring a running condition of a vehicle by detecting rotation of a wheel of the vehicle.

2. Related Background Art

Wheeled vehicles running on a road or rails include a bicycle, automobile, electric car or train etc. Computer-based running condition measuring apparatus are known which measure or compute a running condition of the vehicle (e.g., vehicle speed, traveled distance). Particularly, when applied to the bicycle, such a running condition measuring apparatus is called "cycle computer."

For example, in the cycle computer, a magnet is mounted on one of spokes of a front wheel while a magnetic detector is fixed to a fork blade to detect passing of the magnet.

In the prior art, a reed switch has been used as the magnetic detector. The reed switch is normally kept in an OFF condition. When the magnet passes by the reed switch as the wheel rotates, the reed switch is turned ON. Thus it generates a magnet detection signal (reed switch signal) every revolution of the wheel. The number of revolutions of the wheel per unit time is measured from the detection signal. The cycle computer CPU computes a traveled distance and/or a speed of the bicycle by multiplying the detected number of revolutions of the wheel by wheel circumference data previously stored. A display device such as a liquid crystal display device (LCD) displays the computed results.

In the prior art running measuring apparatus, continuous power supply is provided to various components of the apparatus (e.g., display device) even when the vehicle is stopped or at rest. This results in wasteful power consumption.

Some prior art cycle computer employs a transmitter (first device) including a rotation detector, and a receiver (second device) including a CPU for computing the running condition. The first and second devices are independently powered by their own battery. When the battery power in the receiver is used up, the transmitter can no longer send a rotation signal to the receiver. In the absence of the rotation signal, CPU in the receiver mistakes the power failure of the receiver for the stopped condition of the vehicle.

SUMMARY OF THE INVENTION

It is, therefore, an object of the invention to provide a vehicle running condition measuring apparatus capable of saving electric power consumption by controlling electric power supply depending on whether the vehicle is running or at rest.

The object is essentially achieved by an apparatus for measuring a running condition of a vehicle which comprises rotation detector means (14, 30, 31, 31P) for detecting rotation of a wheel of the vehicle to generate a rotation signal, computing means (51) for computing the running condition of the vehicle from the rotation signal, and display means (57) for displaying the computed running condition. The apparatus is characterized by determining means (51) for monitoring the rotation signal to determine whether the vehicle is running or stopped, and control means (51) for stopping electric power supply when the determining means finds that the vehicle is stopped.

Another object of the invention is to provide a vehicle running condition measuring apparatus employing first and second devices separated from each other and independently powered by their own battery in which the second device can detect the power failure of the first device.

The object is essentially achieved by an apparatus for measuring a running condition of a vehicle which employs a first device and a second device separated from the first device. The first device comprises rotation detector means (14, 30, 31P) for detecting rotation of a wheel of the vehicle to generate a rotation signal, transmitter means (33–35, 38–40) coupled to the rotation detector means for transmitting the rotation signal, and battery means for supplying electric power to the rotation detector means and the transmitter means. The second device comprises receiver means (60–62) for receiving the rotation signal transmitted from the transmitter means, computing means (51) for computing the running condition of the vehicle from the received rotation signal, and display means (57) for displaying the computed running condition. In accordance with the invention, the second device further comprises battery condition determining means (51) for determining a condition of the battery means in the first device from the rotation signal received by the receiver means.

BRIEF DESCRIPTION OF THE DRAWINGS

The above and other objects, features and advantages of the invention will be more apparent from the following description taken in conjunction with the drawings in which:

FIGS. 8(*a*), 8(*b*) 8(*c*) and 8(*d*) are waveforms of signals in FIGS. 3 and 4, generated when the bicycle is running;

FIGS. 9(*a*), 9(*b*) 9(*c*) and 9(*d*) are waveforms of signals in FIGS. 3 and 4, generated when the bicycle is stopped;

FIG. 11 is a circuit diagram of a rotation detector in accordance with a second embodiment of the present invention;

FIGS. 12 (*a*), 12(*b*) and 12(*c*) are waveforms showing an operation of the second embodiment, showing power supply conditions of the transmitter and receiver together with the rotation signal;

FIG. 14 is a block diagram of a receiver in accordance with a third embodiment of the present invention;

FIGS. 15(a), 15(b) 15(c) and 15(d) are waveforms of signals in FIG.14; and

DETAILED DESCRIPTION OF THE PREFERRED EMBODIMENTS

The present invention will now be described in detail with respect to embodiments with reference to the accompanying drawings. In the detailed description, the invention applies to a cycle computer for measuring a running condition of a bicycle by way of example.

(First Embodiment)

The first embodiment of the invention is shown in FIGS. 1–9.

Figure 1:
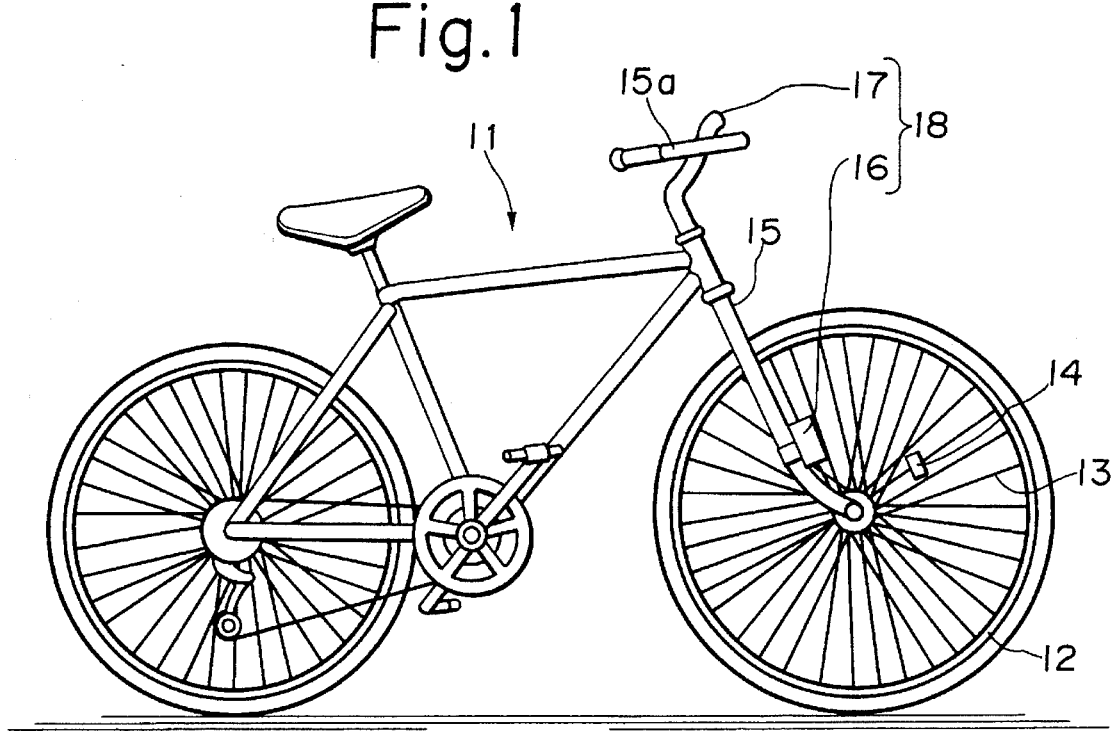
FIG. 1 is a side elevational view of a bicycle to which a cycle computer is applied in accordance with a first embodiment of the present invention.

FIG. 1 shows a side elevational view of a bicycle 11 to which the cycle computer of the first embodiment is applied. A magnet 14 is attached to one of spokes 13 of a front wheel 12 of the bicycle 11. A rotation detector 16 is secured to a fork blade of a body 15 of the bicycle 11. The rotation detector 16 is disposed in or by a rotating path of the magnet 14. Further, an operation and display device 17 is mounted on a handle 15a. The device 17 computes and displays running condition of the bicycle such as traveled distance and/or running speed of the bicycle from the wheel rotation information (rotation signal) detected by the rotation detector 16.

Radio communication is employed to send the rotation signal from the rotation detector 16 to the operation and display device 17. The rotation detector 16, and the operation and display device 17 are independently powered by their own battery.

Figure 2:
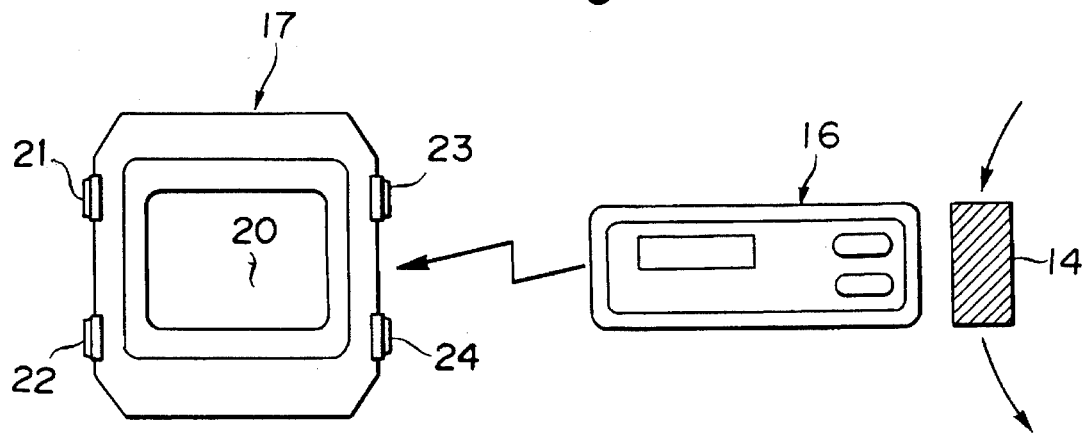
FIG. 2 is an external view of a rotation detector, and an operation and display device in the cycle computer of FIG. 1.

FIG. 2 shows an external view of the rotation detector 16 and the operation and display device 17 of the cycle computer of FIG. 1.

In FIG.2, the rotation detector 16 detects the rotation signal of the front wheel from magnet 14. The rotation detector 16 includes a radio transmitter which sends the rotation signal to a radio receiver in the operation and display device 17. The operation and display device 17 computes the running condition of the bicycle 11 (e.g., vehicle speed, traveled distance) from the rotation signal, and displays the results on a liquid crystal display device (LCD) 20. The operation and display device 17 has a plurality of keys arranged in its periphery, such as data entry key 21 for inputting data (e.g., weight of bicycle and driver) start key 22, end key 23 and second data entry key 24 for entering data (e.g., circumference of the front wheel).

Figure 3:
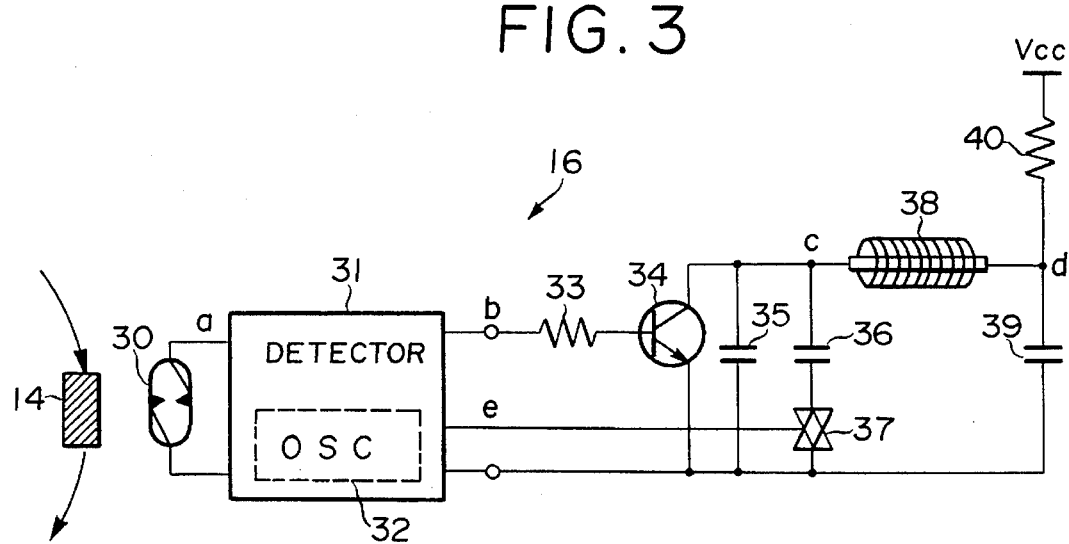
FIG. 3 is a circuit diagram of the rotation detector of the first embodiment.

FIG. 3 is a circuit diagram of the rotation detector 16 in accordance with the first embodiment. In FIG. 3, when the magnet 14 passes by a magnetic reed switch 30, the latter turns on to output a reed switch signal a to a detector 31.

The detector 31 incorporates an oscillator 32 therein. When receiving the reed switch signal a from the reed switch 30, the detector 31 converts the reed switch signal into successive clock signal pulses b. The pulses are sent to a base of an N-P-N transistor 34 through a resistor 33.

A capacitor 35 is connected between a collector and emitter of the transistor 34. A second capacitor 36 and a switching element 37 are also connected between the collector and emitter of the transistor 34. The collector of the transistor 34 is connected to one end of an electromagnetic induction coil 38 at a connection point c. The emitter is connected to the detector 31 ground.

A resistor 40 is connected between a voltage Vcc and the other end of the induction coil 38 at a connection point d. A third capacitor 39 is connected between the other end of the induction coil 38 and the emitter of the transistor 34.

The elements 33–40 constitute the radio transmitter. The induction coil 38, capacitors 35, 36, 39 and the switching element 37 form an LC oscillator. The LC oscillator resonates at either a first or second radio frequency depending on whether the switching element 37 is opened or closed. The switching element 37 is placed in an off position when the bicycle 11 is running. The detector 32 generates a stop command signal e when the bicycle 11 is stopped. The stop command signal e turns on the switching element 37 so that the capacitor 36 is added to the LC oscillator, changing (reducing) its radio resonance frequency.

In this manner, when the bicycle 11 is running the radio transmitter emits a first radio signal (run signal) at a relatively high frequency in response to the passing of the magnet 14 whereas it emits a second radio signal (stop signal) at a relatively low frequency when the bicycle 11 is stopped.

Figure 4:
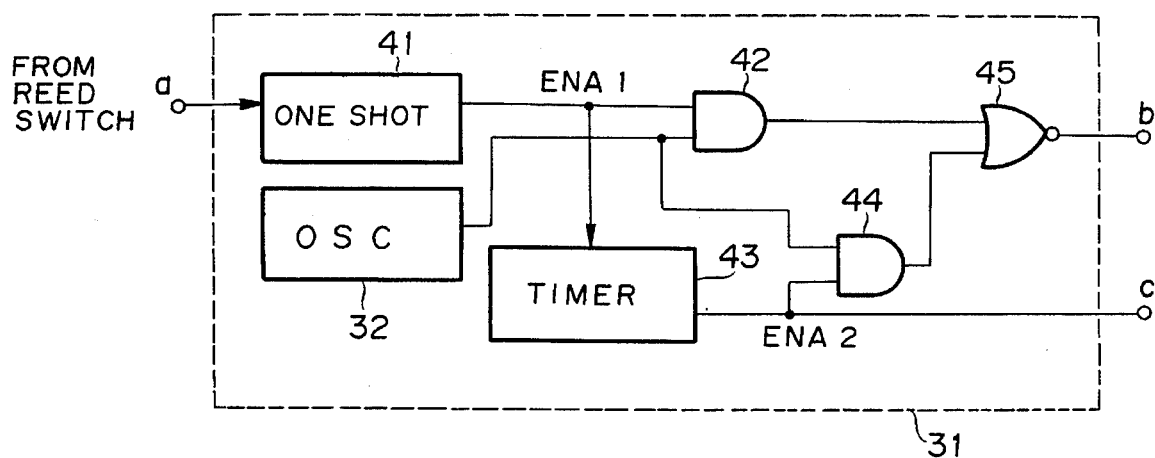
FIG. 4 is a block diagram of a detector in FIG. 3.

FIG. 4 is a block diagram of the detector 31 shown in FIG. 3.

In response to the reed switch signal a indicative of the passing of the magnet 14, a one-shot multivibrator 41 generates a one-shot pulse ENA1.

The one shot pulse enables an AND gate 42 to pass clock signal pulses from the oscillator 32 during the width of the one-shot pulse.

A timer 43 is triggered by the one-shot pulse ENA1 to measure lapse of a predetermined time period. If the next one-shot pulse (rotation detection signal) comes in before the timer is timed out, the timer restarts its operation from an initial value. Thus, while the bicycle is running, the timer 43 will not be timed out. When the bicycle is stopped, the reed switch 30 will no longer generate a reed switch signal, causing the timer 43 to time out. Then, the timer 43 generates a stop command signal ENA2 (e) for a short time corresponding to the duration of the one-shot pulse.

The stop command signal ENA2 enables an AND gate 44 to pass clock pulses from the oscillator 32 for the duration of the signal ENA2.

A NOR gate 45 has two inputs receiving the AND 42 output and AND 44 output, respectively. Thus, the NOR gate 43 outputs clock pulses b either when the magnet 14 passes by the reed switch 30 or when the timer 43 is timed out, indicating the stopped condition of the bicycle 11.

In this manner, the rotation detector 16 of the first embodiment transmits a first radio signal (run signal) in response to the passing of the magnet 14 when the bicycle 11 is running. On the other hand, when the bicycle 11 is stopped, the rotation detector 16 transmits a second and different radio signal (stop signal) in response to the time-out of the timer 43. The transmitted signal is received by the operation and display device 17.

The operation and display device 17 will now be described.

Figure 5:
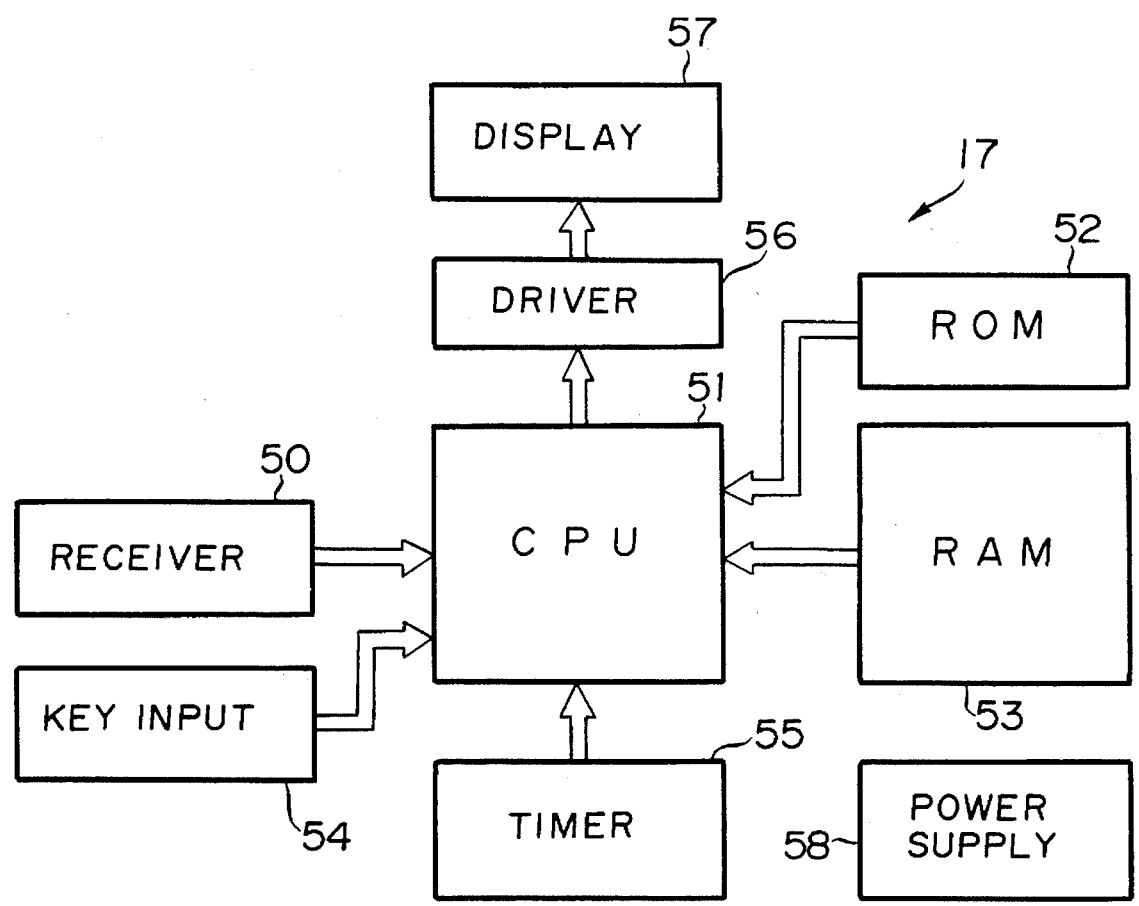
FIG. 5 is a block diagram of the operation and display device of the first embodiment.

FIG. 5 shows block diagram of the operation and display device 17 in accordance with the first embodiment. A receiver 50 receives the radio signal from the transmitter in the rotation detector 16. It is remembered that the radio signal is either the run signal having a higher frequency or the stop signal having a lower frequency. To distinguish between the run and stop signals, the receiver 50 processes the received radio signal into a pulse count. The pulse count is supplied to CPU 51.

CPU 51 is connected to a program ROM (Read Only Memory) 52 and a RAM (Random Access Memory) 53. CPU 51 operates in accordance with the program stored in the program ROM to control the entire system of the operation and display device 17, e.g., to control a LCD display 57 through a display driver 56. In particular, CPU 51 determines from the radio signal pulse count as to whether the vehicle is running or is stopped. Based on the results of determination, CPU 51 selectively stops or re-starts the supplying of electric power from a power supply 58, thus reducing the wasteful consumption of the electric power. CPU 51 also uses the results of the determination to compute the running condition of the bicycle such as the average speed and traveled time with high accuracy. Further, the CPU 51 processes signals entered from a key input device 54 having the keys 21–24.

ROM 52 stores a program for controlling CPU 51 of the cycle computer 18.

RAM 53 stores data and parameters required for computing the running condition of the bicycle 11.

A timer 55 is constituted by a crystal oscillator and a frequency divider circuit which frequency-divides a crystal output signal into a time signal. CPU 51 receives the time signal for time management of the cycle computer (e.g., for measuring the time of receiving the rotation signal pulse).

A power supply 58 supplies electric power to various components of the operation and display device 17.

Figure 6:
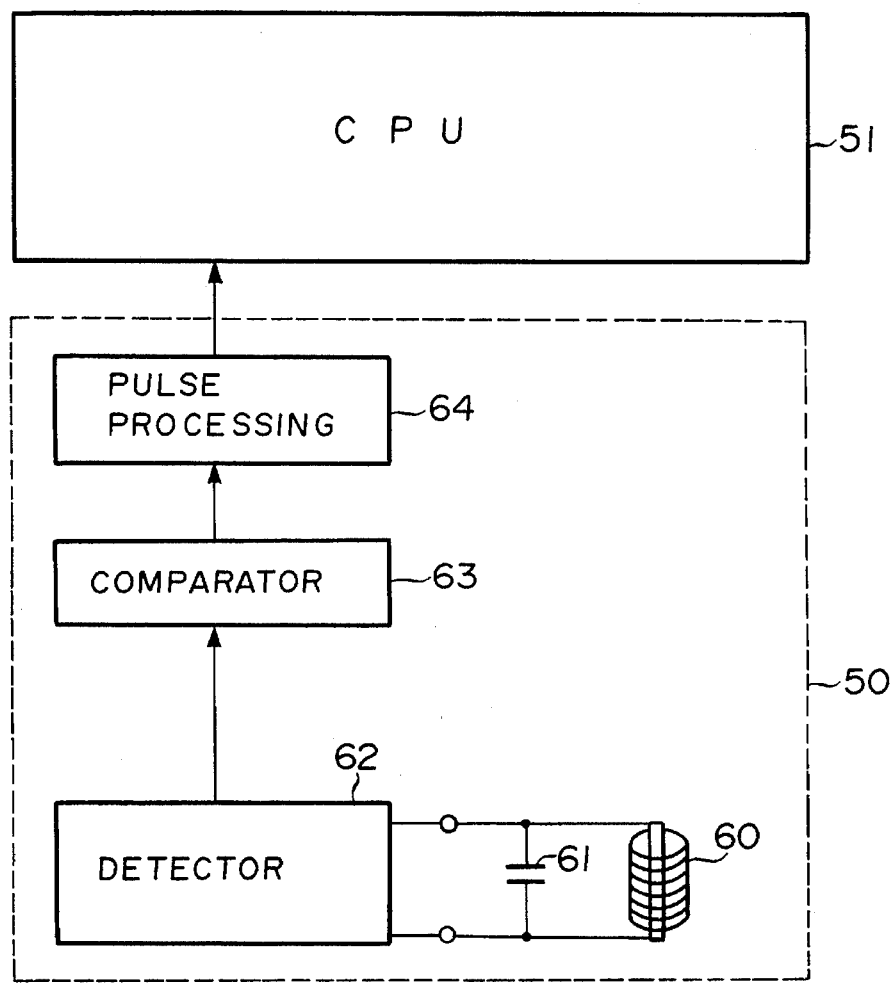
FIG. 6 is a block diagram of a receiver of the first embodiment.

FIG. 6 shows a block diagram of the receiver 50. As shown in FIG. 6, the receiver 50 has a resonance circuit comprising an electromagnetic induction coil 60 and a capacitor 61 in parallel connection. The resonance circuit receives the radio signal from the transmitter (electromagnetic induction coil 38). A detector 62 is connected to the resonance circuit 60 to amplify the received signal. A comparator 63 compares the amplified signal from the detector 62 with a predetermined threshold voltage level, thus forming a train of pulses. A pulse processing circuit 64 counts the pulses from the comparator 63. Further, the pulse processing circuit 64 generates an end-of-pulse signal when the pulse train has ended. In response to the end-of-pulse signal, CPU 51 reads the pulse count from the pulse processing circuit 64.

Figure 7:
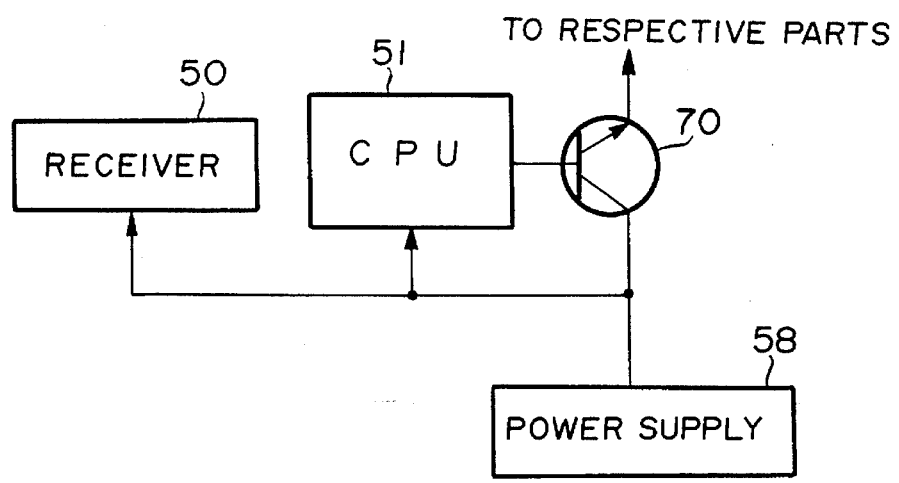
FIG. 7 is a block diagram of a power supply control in accordance with the first embodiment.

FIG. 7 is a circuit diagram of the power supply 58 and associated control in accordance with the first embodiment. As shown in FIG. 7, the power supply 58 is directly connected to the receiver 50 and CPU 51 to always supply to the electric power to them. However, the power supply 58 selectively supplies the electric power to the other parts (for example, the display driver 56 and display device 57 in FIG. 5) through a transistor 70. CPU 51 controls the transistor 70 as follows. It turns on the transistor 70 when detecting that the bicycle 11 starts running. CPU 51 turns off the transistor 70 when the bicycle 11 is stopped. In this manner, CPU 51 automatically controls the electric power supply, saving the wasteful power consumption.

FIGS. 8(a), 8(b) 8(c) and 8(d) and FIGS. 9(a), 9(b) 9(c) and 9(d) are waveforms showing signals of the respective parts shown in FIGS. 3 and 4.

An operation of the cycle computer 18 of the first embodiment will now be described with reference to a flow chart shown in FIG. 10.

When the bicycle 11 starts running, the magnet 14 on the front wheel 12 rotates.

Consequently, in FIG. 3, the reed switch 30 in the rotation detector 16 turns on and generates a reed switch signal a (FIG. 8(a)) each time when the rotation magnet 14 passes by the reed switch. The reed switch signal a occurs once per revolution of the wheel 12.

In response to the reed switch signal, the one-shot multivibrator 41 in the detector 31 (FIG. 4) generates a one-shot pulse ENA 1. The one-shot pulse ENA1 enables the AND gate 42 to pass clock signal pulses from the oscillator 32 to the transistor 34 by the NOR gate 45 and the resistor 33 (see FIG. 8(b)).

The one-shot pulse ENA1 also causes the timer 43 to restart its counting operation from an initialized condition to measure laspe of a predetermined time (FIG. 8(c)).

During the running of the bicycle 11, the one-shot pulse ENA1 occurs once per revolution of the wheel so that the timer 43 restarts its operation before the time-out without generating the stop command signal ENA2 (FIG. 8(d)).

As a result, the radio transmitter 33–40 transmits a first radio signal (run signal) at a first and higher frequency in response to passing of the magnet 14.

When the bicycle 11 is stopped, the one-shot pulse ENA1 will no longer occur, causing the timer 43 to time out and generate the stop command signal ENA2 or e (FIG. 9(c)).

The stop command signal ENA2 enables the AND gate 44 to pass clock pulses from the oscillator 32 to the transistor 34 by the NOR gate 45 and the resistor 33 (FIG. 9(d)). Further, the stop command signal ENA2 or e turns on the switch 37 to connect the capacitor 36 in the circuit of the LC oscillator, decreasing its resonant frequency. Thus, the radio transmitter 33–40 transmits a second radio signal (stop signal) having the lower frequency than that of the first radio signal.

Figure 10:
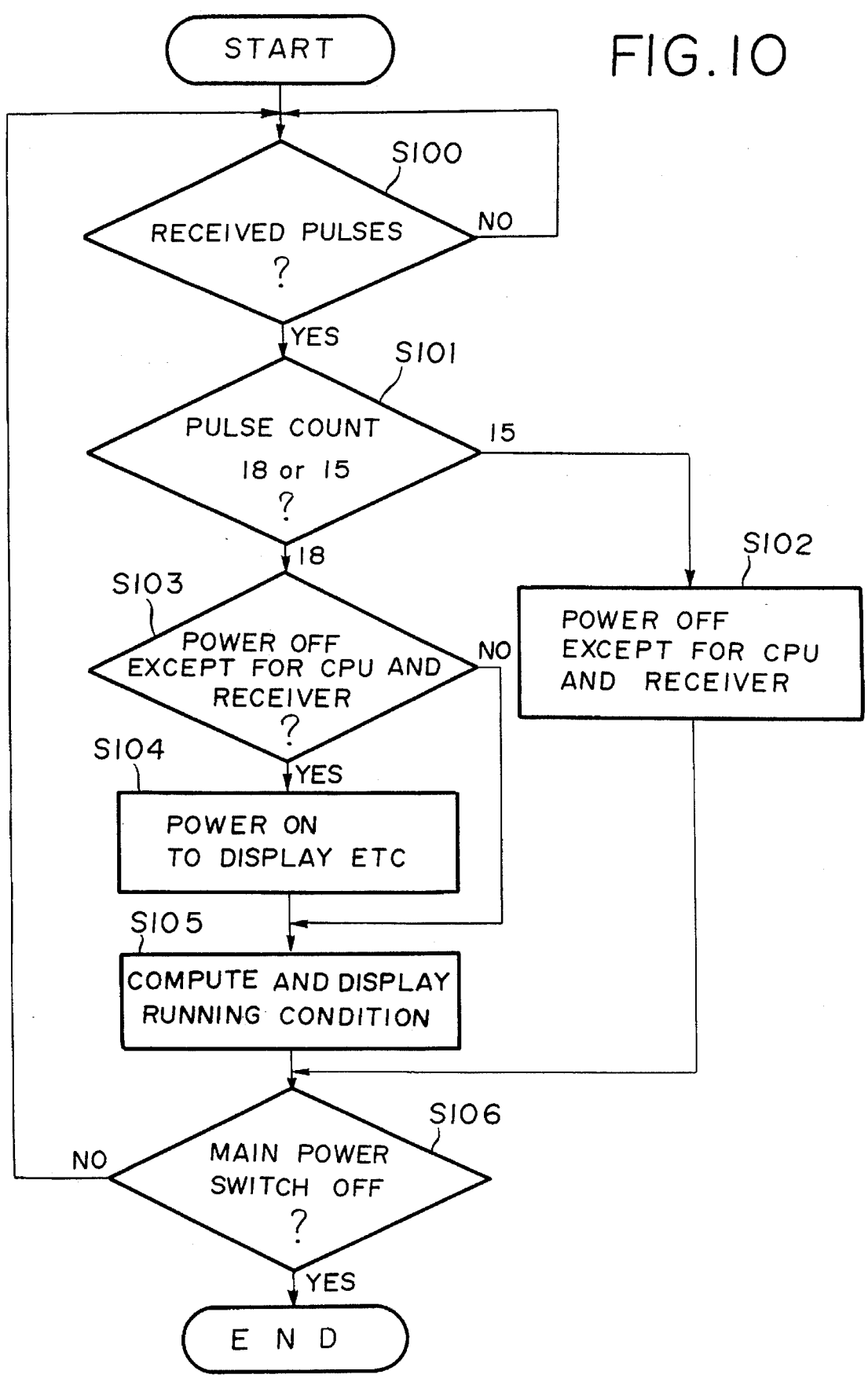
FIG. 10 is a flow chart showing an operation of the cycle computer in accordance with the first embodiment.

In the operation and display device 17, the receiver 50 receives the radio signal transmitted from the rotation detector 16 (step S100 in FIG. 10). The receiver 50 processes the received signal into pulses and counts them. CPU 51 reads and tests the pulse count to determine whether the bicycle 11 is running or stopped (S101). The pulse count of 18 may be derived from the first radio signal (run signal which is generated in response to passing of the magnet) whereas the pulse count of 15 may be derived from the second radio signal (stop signal generated when the predetermined time has elapsed without any occurrence of the magnet passing). Thus, the pulse count of 18 is generated when the bicycle is running regardless of a running speed. The 18 pulses indicate that the bicycle is running whereas the pulse count of 15 indicates when the bicycle 11 is stopped.

When reading the pulse count of 15 (i.e., when detecting the bicycle 11 is stopped), CPU 51 turns off the transistor 70 (FIG. 7), thus stopping electric power supply except for CPU 51 and receiver 50 (S102).

When reading the pulse count of 18, CPU 51 checks as to whether the power is off except for CPU 51 and the receiver 50. If this is the case, CPU 51 turns on the transistor 70, thus starting the electric power supply to the display device 57 etc. (S104). At step 105, CPU 51 computes the running condition of the bicycle 11 and displays the results on the display device 57. From the decision at S101, CPU 51 measures the rest period during which the bicycle is at rest and the run period during which the bicycle is running. Such information is used to compute the average speed or traveled time with a high accuracy.

If the end key is depressed, CPU 51 turns off the main power switch (S106). Otherwise, CPU 51 returns to step S100 and continues its operation.

In this manner, the rotation detector 16 of the first embodiment transmits first or second radio signal having different frequencies, depending on whether the vehicle is running or stopped. The operation and display device 17 receives the radio signal and identifies it by counting the pulses, thus determining in real-time whether the vehicle is running or stopped. When detecting the stop of the vehicle, the operation and display device 17 stops the electric power supply to the components such as display device 57. When detecting the vehicle starts running, the operation and display device 17 restarts the electric power supply. This minimizes the electric power consumption. In addition, the operation and display device 17 uses the results of the determination to correctly compute the running parameters such as the average speed and traveled time.

(Second Embodiment)

Figure 13:
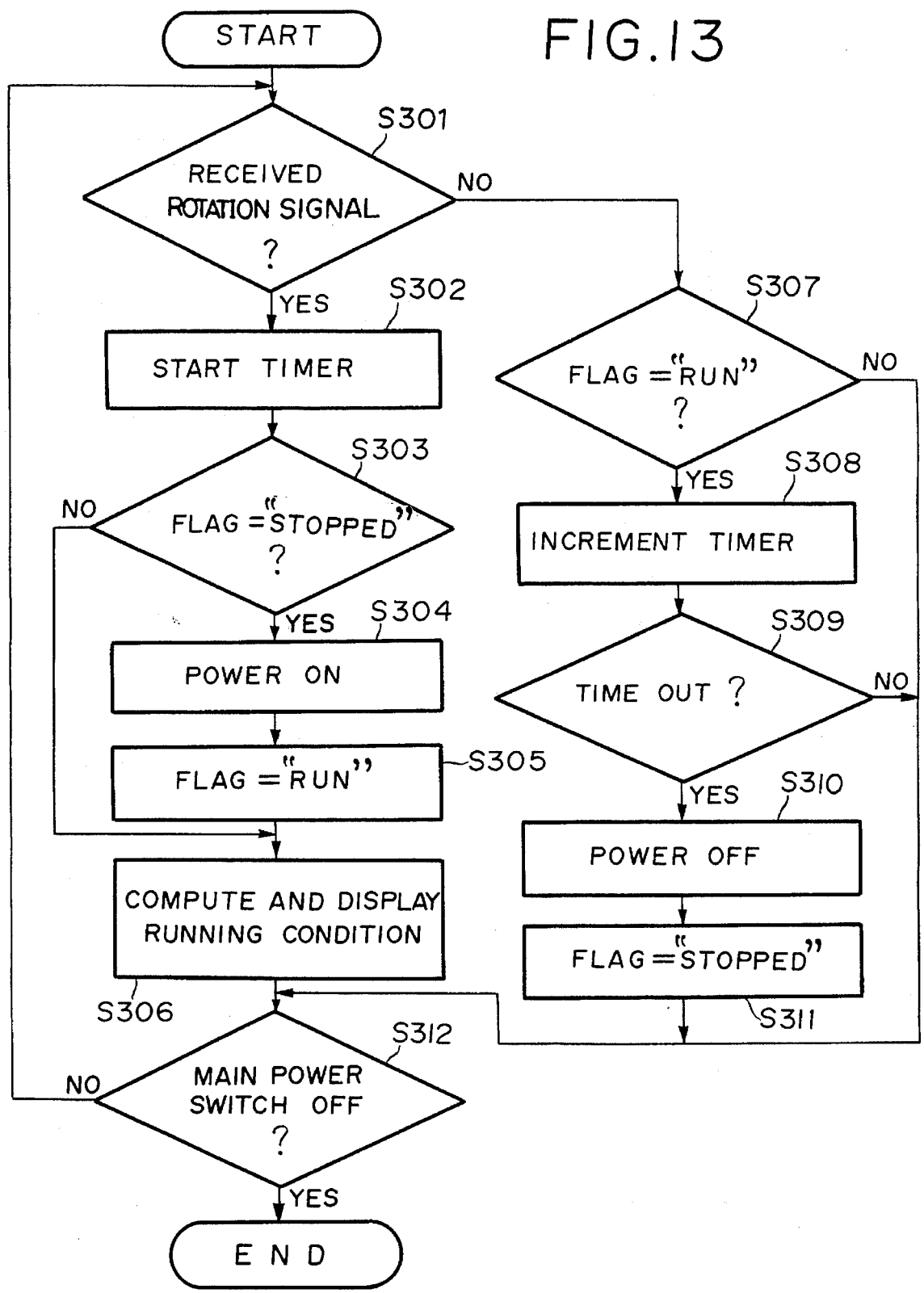
FIG. 13 is a flow chart showing an operation of the cycle computer in accordance with the second embodiment.

FIGS. 11 to 13 show a running condition measuring apparatus in accordance with a second embodiment of the invention. FIG. 11 is a circuit diagram of the rotation detector 16P. FIGS. 12(*a*), 12(*b*) and 12(*c*) are timing charts showing power supplying condition of the rotation detector, and operation and display device together with the rotation signal.

The rotation detector 16P of the second embodiment generates and transmits the rotation signal shown in FIG. 12(*a*) (run signal) indicative of the passing of the magnet when the vehicle is running. On the other hand, when the vehicle is stopped, the rotation detector 16P does not generate or transmit any signal to the operation and display device.

In FIG. 11, as the wheel 12 rotates, the magnet 14 passes by the reed switch 30, changing the magnetic field. The magnetic change turns on the reed switch 30 to output the reed switch signal a to the detector 31P. The detector 31P incorporates the oscillator 32. The detector circuit 31P converts reed switch signal a into successive clock pulses b. The pulses b are applied to the base of N-P-N transistor 34 through the resistor 33.

The detector circuit 31P comprises the one-shot multivibrator 41, oscillator 32 and AND gate 42 shown in FIG. 4.

The capacitor 35 is connected between the collector and emitter of the transistor 34. The collector of the transistor 34 is connected to one end of the electromagnetic induction coil 38. The emitter is connected to the detector 31P ground. A voltage Vcc is applied to the other end of the induction coil 38 and one end of the capacitor 39 through the resistor 40. The other end of the capacitor 39 is connected to the emitter of the transistor 34.

Accordingly, in the rotation detector 16P, the transistor 34 repeats switching between on and off states in response to the clock pulses b. This resonates the LC oscillator (35, 38, 39) so that induction coil 38 emits a radio signal.

In this way, the rotation detector 16P transmits a radio signal (rotation signal) in response to the magnet passing when the vehicle is running. It does not transmit any radio signal, however, when the vehicle is stopped or at rest.

The operation and display device 17 of the second embodiment has essentially the same structure as that of the first embodiment already described in connection with FIG. 5.

An operation of the running condition measuring apparatus of the second embodiment will now be described with reference to FIGS. 12(*a*), 12(*b*) and 12(*c*) and 13.

The operation and display device 17 of the second embodiment monitors the rotation signal transmitted from the rotation detector 16P via the receiver 50. As shown by an X or Z point in FIGS. 12(*a*), 12(*b*) and 12(*c*), when the receiver receives the rotation signal (step S301), CPU 51 in the operation and display device starts a software timer in RAM 53 (step S302). At this time, if a running condition flag is "stopped" (step S303) as in the case of point Z in FIGS. 12(*a*), 12(*b*) and 12(*c*), it means that the vehicle starts running. In this case, CPU 51 turns on the transistor 70 (FIG. 7) to start the supply of the electric power to the display device 57 etc. (step S304 ) and sets the flag to "run" ( step S305 ).

At step S306, the CPU 51 computes the running condition (vehicle speed and traveled distance) and displays the computed running condition on the display device 57.

If the receiver does not receive the rotation signal (S301) and if the flag is "run" (step S307), the CPU 51 increments the software timer (step S308).

Accordingly, the software timer is timed out (step S309) when the receiver 50 does not receive the rotation signal for a predetermined time (for example, one minute). This timing is indicated by a point Y in FIGS. 12(*a*), 12(*b*) and 12(*c*). At this time, CPU 51 turns off the transistor 70 to stop the supply of the electric power to the display device 57 etc. (step S310) and sets the running condition flag to "stopped" (step S311).

The operation of the operation and display device continues until the main power switch is turned off step S312).

(Third Embodiment)

A third embodiment of the present invention will now be described.

The cycle computer of the third embodiment is essentially the same as that of the first and second embodiments in terms of overall arrangement (FIG. 1), appearance (FIG. 2), and the operation and display device 17 structure (FIG. 5). The cycle computer of the third embodiment employs the rotation detector 16P of the type shown in FIG. 11 described in conjunction with the second embodiment. The cycle computer of the third embodiment employs, however, a unique receiver 50M shown in FIG. 14 to monitor the battery condition of the rotation detector 16P.

FIG. 14 shows a block diagram of the receiver 50M. FIG. 15 shows a timing chart of the receiver of FIG. 14.

In FIG. 14, the receiver 50M receives the radio rotation signal transmitted from the rotation detector 16P by means of the induction coil 60 combined with the parallel capacitor 61.

The detector 62 amplifies the received rotation signal as shown in FIG. 15(*a*).

The comparator 63 compares the amplified rotation signal with a predetermined threshold voltage level (Vth), thus shaping it into a pulse train as shown in FIG. 15(*b*).

The pulse processing circuit 64 counts the pulses in the pulse train to provide the pulse count to CPU 51. At the end of the pulse train, the pulse processing circuit 64 generates an end-of-pulse signal shown in FIG. 15(*c*).

The peak-hold circuit 65 detects and holds a peak voltage of the rotation signal from the detector 62, as shown in FIG. 15(*d*). The analog-to-digital converter (ACD) 66 converts the analog peak voltage held by the peak-hold circuit 65 into a corresponding digital signal.

In response to the end-of-pulse signal CPU 51 reads the pulse count from the pulse processing circuit 64, and the peak voltage data from ADC 66, respectively.

An operation of the cycle computer 18 of the third embodiment will now be described with reference to a flow chart shown in FIG. 16.

Figure 16:
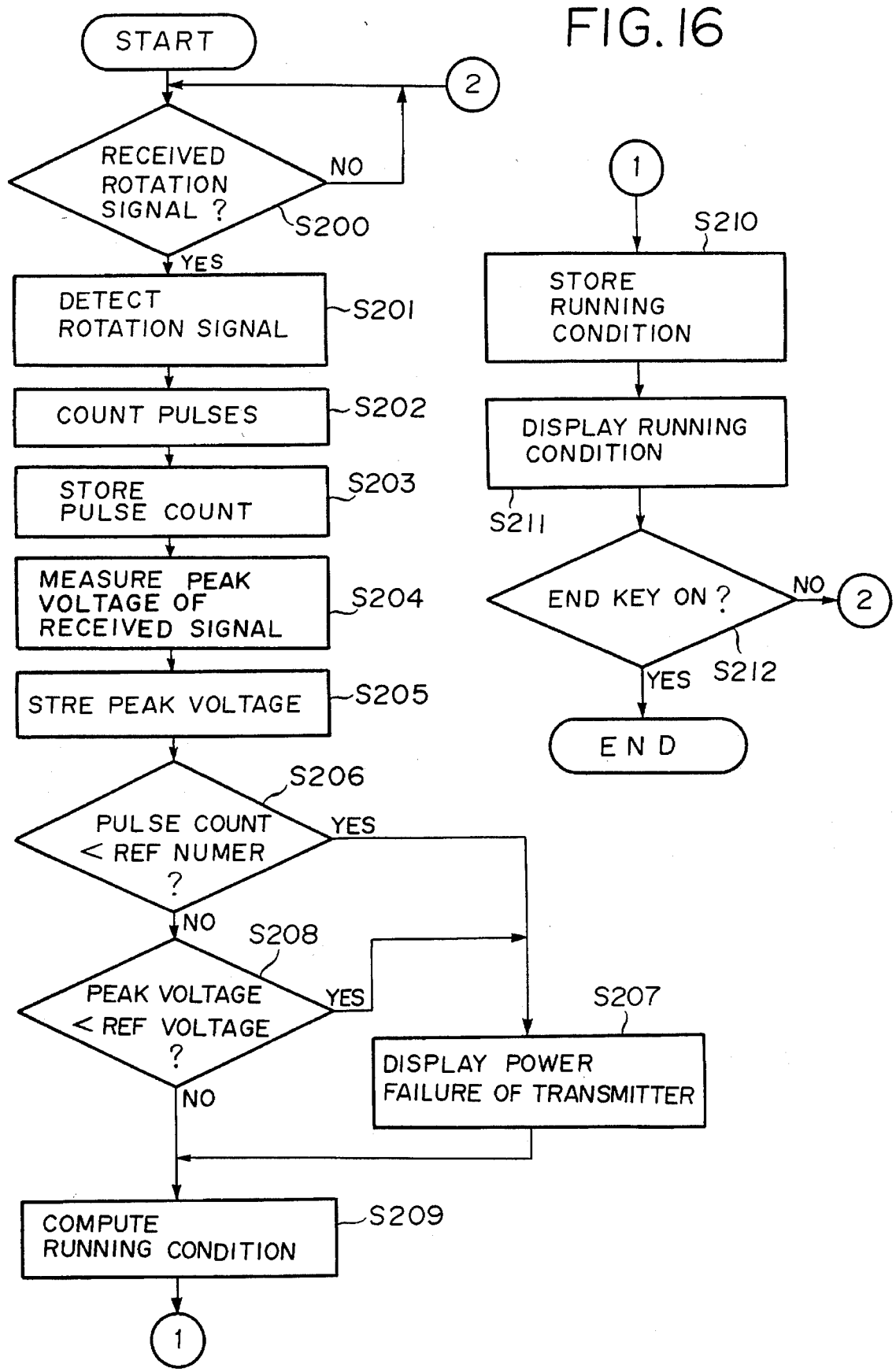
FIG. 16 is a flow chart showing an operation of the cycle computer in accordance with the third embodiment.

FIG. 16 is a flow chart of the operation and device 17 of the third embodiment.

When the bicycle 11 (FIG. 1) is running, the magnet 14 the front wheel 12 rotates.

Thus, the reed switch 30 in the rotation detector 16P turns on each time when the magnet 14 passes by the reed switch, causing the radio transmitter to send the radio rotation signal.

The operation and display device 17 receives the radio rotation signal by the resonance circuit (60, 61) in the receiver 50M (S200). The detector 62 in the receiver amplifies the received rotation signal (S201). The comparator 63 wave-shapes the amplified rotation signal into a train of pulses. The pulse processing circuit 64 counts the pulses (S202). Concurrently, the peak-hold circuit detects and holds the peak voltage of the rotation signal. At the end of the pulse train, the pulse processing circuit 64 generates the end-of-pulse signal, thus requesting CPU 51 to read and store the pulse count from the pulse processing circuit 64 and the peak voltage signal from the peak-hold circuit via ADC 66 (S203, S205).

Then, CPU 51 tests the strength of the received rotation signal to determined the battery condition of the rotation detector 16P. Specifically, CPU 51 compares the pulse count of the received rotation signal with a predetermined number (S206). Further, CPU 51 compares the peak voltage of the received signal with a predetermined voltage level (S208). If the pulse count is less than the predetermined number or if the peak voltage is lower than the predetermined voltage level, CPU 51 visually indicates the power failure of the rotation detector 16P (transmitter) on the display device 57.

After testing the battery condition of the rotation detector 16P, CPU 51 computes the running condition of the bicycle 11 (S209). To this end, CPU 51 measures the time interval between the rotation signals and counts the rotation signals. The bicycle speed (per hour) is computed by (3600/time interval×wheel circumference). The traveled distance is obtained by multiplying the count of the rotation signals by the wheel circumference. CPU 51 stores the results of the computation in RAM 53 (S210) and displays them on the display device 57 (S211).

The operation of the device 17 continues until the end key is pressed (S212).

In this manner, the cycle computer of the third embodiment has the feature of automatically determining and indicating the battery condition of the rotation detector 16P. The operation and display device 17 monitors the strength of the received rotation signals sent from the rotation detector 16P. The device 17 detects reduced capacity of the battery in the rotation detector 16P and provides the alarm message of the power failure. The feature does not increase the cost or complexity of the cycle computer since no additional circuit is required in the rotation detector 16P.

This concludes the detailed description. However, various modifications and applications will be obvious to a person of ordinal skill in the art.

For example, the cycle computer of the second embodiment can readily be combined with that of the third embodiment such that the combined cycle computer has both the feature of controlling the electric power supply in the operation and display device and the feature of automatically determining the battery condition of the rotation detector.

In place of the radio comunication, the rotation detector (first device) may be connected by a cable to the operation and display device (second device). This will eliminate the radio transmitter and receiver from the cycle computer so that the output of the detector 31 or 31P may directly be connected to CPU 51. If desired, the rotation detector and the operation and display device may share a common battery.

In place of the visual indication, an alarm buzzer or voice message may be employed to warn the user of the power failure of the rotation detector.

The invention can also apply to vehicles other than the bicycle, such as electric cars, automobiles.

Therefore, the scope of the invention should be limited solely by the appended claims.

What is claimed is:

1. An apparatus for measuring a running condition of a vehicle, comprising:

a rotation detector for detecting rotation of a wheel of said vehicle to generate a rotation signal;

first signal generating means operatively connected to said rotation detector, for generating a first radio signal when said rotation detector continues to generate the rotation signal for over a predetermined period of time;

second signal generating means for generating a second radio signal when said rotation detector does not continue to generate the rotation signal for over the predetermined period of time;

signal receiving means for receiving the first radio signal when said first signal generating means generates the first radio signal, and for receiving the second radio signal when said second signal generating means generates the second radio signal;

computing means for computing a running condition of said vehicle from said first radio signal received by said signal receiving means;

display means for displaying said running condition computed by said computing means; and control means for stopping a flow of electric power from an electric power supply source when said signal receiving means receives the second radio signal generated by said second signal generating means.

2. The apparatus according to claim 1, wherein said control means includes means for stopping the flow of electric power from said electric power supply source to said display means when said signal receiving means receives the second radio signal generated by said second signal generating means.

3. The apparatus according to claim 1, wherein said control means includes means for continuing said flow of electric power from said electric power supply source to said rotation detector even when said signal receiving means receives the second radio signal generated by said second signal generating means.

4. The apparatus according to claim 1, wherein said control means includes:

means for stopping said flow of electric power from said electric power supply source when said signal receiving means receives the second radio signal generated by said second signal generating means; and means for starting said flow of electric power when said signal receiving means receives the first radio signal generated by said first signal generating means.

5. The apparatus according to claim 1, wherein said running condition computed by said computing means is one of a speed and a traveled distance of said vehicle.

6. The apparatus according to claim 1, wherein the apparatus is attached to a bicycle to compute and display said running condition of said bicycle.

7. The apparatus according to claim 1, wherein said second signal generating means comprises:

a timer responsive to each generation of the rotation signal by said rotation detector, for timing a time lapse after the generation of the rotation signal by said rotation detector; and a signal generator for generating the second radio signal when said timer has timed a predetermined period of time.

8. An apparatus for measuring a running condition of a vehicle, comprising:

a first device; and a second device separated from said first device;

wherein said first device comprises:

rotation detector means for detecting rotation of a wheel of a vehicle to generate a rotation signal;

transmitter means coupled to said rotation detector means for transmitting said rotation signal; and battery means for supplying electric power to said rotation detector means and said transmitter means;

wherein said second device comprises:

receiver means for receiving said rotation signal transmitted from said transmitter means;

computing means for computing a running condition of said vehicle from said received rotation signal;

display means for displaying said computed running condition; and battery condition determining means for determining a condition of said battery means in said first device from said rotation signal received by said receiver means.

9. The apparatus according to claim 8, wherein said receiver means comprises:

shaping means for shaping said received rotation signal into pulses;

counting means for counting said pulses to provide a pulse count; and means for determining a capacity of said battery means based on a pulse count counted by said counting means.

10. The apparatus according to claim 8, wherein said battery condition determining means comprises:

peak-hold means for detecting and holding a peak voltage of said received rotation signal; and means for determining a capacity of said battery means based on said peak voltage.

11. The apparatus according to claim 8, wherein said battery condition determining means comprises:

shaping means for shaping said received rotation signal into pulses;

counting means for counting said pulses to provide a pulse count;

peak-hold means for detecting and holding a peak voltage of said received rotation signal; and means for determining a capacity of said battery means based on said pulse count counted by said counting means and said peak voltage held by said peak-hold means.

12. The apparatus according to claim 8, wherein said second device further comprises alarm means for providing an alarm upon a power failure of said first device when said battery condition determining means detects a reduced capacity of said battery means.

13. The apparatus according to claim 12, wherein said alarm means comprises display means for displaying an alarm message of said power failure.

14. The apparatus according to claim 8, wherein said transmitter means comprises radio transmitter means for transmitting said rotation signal in a form of a radio signal.

15. The apparatus according to claim 8, wherein the apparatus is attached to a bicycle to compute and display said running condition of said bicycle.

\* \* \* \* \*